Patented Dec. 5, 1950

2,533,196

UNITED STATES PATENT OFFICE 2,533,196

METHOD OF PRODUCING PIGMENTED RESINS

Henry A. Pace, Akron, Ohio, assignor to Wingfoot Corporation, Akron, Ohio, a corporation of Delaware No Drawing. Application August 7, 1944, Serial No. 548,503

1 Claim. (Cl. 260—41)

This invention relates to a method of producing a pigmented resin and more particularly relates to a method of producing pigmented synthetic resinous pearls.

It has been discovered that a material capable of being polymerized and capable of being thickened to a pre-gel stage may be pigmented while the material is in this pre-gel stage and that the pigment will be uniformly suspended and held in this suspended condition during polymerization of the material.

Any material that is capable of being polymerized and capable of being thickened to a pre-gel stage may be used in the process of this invention. It is important that the material be capable of passing from a liquid monomeric state to a pre-gel stage, which stage may be characterized as being one in which the material has been thickened to a viscosity which is of a sufficient degree to hold a pigment which has been added to the material in a dispersed condition until the material has polymerized to a gel prior to complete polymerization. If the pigment is incorporated into the monomer without first increasing its viscosity the pigment will settle out in the most part by gravity or otherwise be removed by the washing action of the suspension medium in which the material is being polymerized. Although thickening does not make too great a change in the density of the monomer the increased viscosity keeps the pigment in suspension until gelation occurs and permanently traps the pigment.

Examples of polymerizable materials that may be used in accordance with this invention are: Allyl esters of dibasic acids, as for example, the diallyl esters of such saturated dibasic acids as oxalic, malonic, methylmalonic, succinic, methylsuccinic, symmetrical dimethyl succinic acids, including the "para" and "anti" acids, unsymmetrical dimethylsuccinic, glutaric, adipic, pimelic, suberic, azelaic, sebacic, the diallyl esters of such unsaturated acids as methylene malonic and the alkylidene malonic acids, maleic, fumaric, citraconic, mesaconic, itaconic, dimethylmaleic, ethyl maleic, methyl ethyl maleic, diethyl maleic, glutaconic, muconic and so forth.

The diallyl carbonates of dihydroxy paraffins such as ethylene glycol, 2,3-butylene glycol and diethylene glycol have been tried and have been found to work as well as the diallyl esters of substituted acids as, for example, the esters of 1,1-dicarboxy-2,3-dicarbethoxy-propane and also 1,1-dicarboxy-2,3-dicarbomethoxypropane. Diallyl derivatives of hydroxy acids and diallyl ether-ester derivatives of aldehyde hydrates are also operable in accordance with the present invention.

The temperature and time required to convert the polymerizable material to a pre-gel stage depends upon the particular monomer being treated. Generally the polymerizable material of this invention may be converted to the pre-gel stage by heating at temperatures between about 45° C. and about 100° C. A greater percentage of these monomers are readily converted to the pre-gel stage at temperatures between about 50° C. and about 80° C. and it is preferred to use temperatures between about 70° C. and about 75° C. Generally the monomer will be converted to the pre-gel stage within about one hour when heated at these temperature conditions. Any catalyst capable of causing the monomer to thicken, and which is monomer soluble, may be used during the thickening process as for example benzoyl peroxide, lauryl peroxide, etc.

It is preferred to heat the allyl esters of dibasic acids, the diallyl derivatives of hydroxy acids, and diallyl ether-ester derivatives of aldehyde hydrates at about 75° C. for about one hour.

The pre-gel stage is essential in the process of this invention because it is at this stage that a pigment is incorporated into the monomer and uniformly dispersed throughout the monomer and maintained in this dispersed condition during subsequent polymerization and stirring. If the conversion of the monomer is carried past the pre-gel stage then incorporation of the pigment into the monomer is impossible.

Any suitable pigment may be added to the heat-treated monomer, as for example, phosphorescent pigments, fluorescent pigments, metallic powders that do not inhibit polymerization, such as iron, aluminum and zinc. Also, inorganic pigments and insoluble organic pigments which likewise do not inhibit polymerization, may be added. Generally the pigment may be incorporated into the treated monomer in an amount between about 1% and about 20% by weight of the total weight of the monomer being pigmented. It is preferred to use between about 10% and about 15% by weight of the monomer and specifically an amount of about 12% by weight of the monomer is found to be highly desirable. The pigment may be uniformly distributed throughout the treated monomer in any suitable manner, as by stirring either manually or mechanically.

The pigmented monomer may be stored in the cold for several days before use. However, during this time there may be a tendency for the pigment to settle. If there are signs of settling then it is desirable that the pigmented monomer be restirred before being subjected to the polymerization operation.

When it is desired to form the pigmented monomer into droplets, commonly referred to as pearls, a suspension medium is used. The suspension medium comprises a water solution of a material which has such a high water solubility that the resulting solution has a density which approximates the density of the pigmented monomer. Suitable materials that may be used in preparing this suspension medium are sodium bisulfite and sodium nitrate or mixtures thereof.

The pigmented monomer is added to the suspension medium and the mixture stirred continuously while being heated at a temperature sufficient to cause the monomer to be polymerized. Suitable polymerization temperatures are between about 40° C. and about 90° C. and preferably between about 60° C. and about 70° C. For the monomers of the allyl esters of dibasic acids, diallyl derivatives of hydroxy acids or diallyl ether-ester derivatives of aldehyde hydrates, the preferred temperature is between about 60° C. and about 70° C. with the temperature being held generally at about 65° C.

During the polymerization operation it is desirable that the stirring be uninterrupted in order to form the greatest number of separate pearls. If the stirring is not continuous then the pearls tend to agglomerate into masses.

During stirring of the mixture the pigmented monomer tends to collect in individual spherical masses or pearls of various sizes. The slower the stirring the larger the size of the pearl and the faster the stirring the smaller the size of the pearl. It has been observed that when the rate of polymerization is too high the pearls are formed with air pockets or bubbles. Best results are obtained when the polymerization temperature is adjusted to cause the heat-treated pigmented monomer to polymerize gradually.

After the polymerization has been completed the resulting pearls are removed from the suspension medium and dried by air or other suitable methods and the dried pearls are then sized in any suitable manner, as for example by passing through sieves having various screen openings.

The resulting pigmented resin finds various uses in the ornamental arts depending upon the particular pigment used and also finds various uses in the scientific instrument arts, as for example, viscosity meters in which the falling ball may be a pearl of the present invention suitably pigmented. The method of this invention is particularly operable in pigmenting large quantities or masses of suitable resin, as in batch operations or in continuous processes.

What I claim is:

The method of producing pigmented resinous pearls which comprises polymerizing a diallyl ester of an alkyl dibasic acid by heating the ester at a temperature between about 70° C. and about 75° C. for about one hour until the ester has been converted to the pre-gel stage, adding a pigment to the thickened resin, adding the pigmented resin to a suspension medium comprising a water solution of at least one member of the group consisting of sodium bisulfite and sodium nitrate and having a density substantially equal to the density of the pigmented resin, continuously stirring the suspension at a temperature between 60° C. and 70° C., until polymerization of the pigmented resin is substantially complete.

HENRY A. PACE.

REFERENCES CITED

The following references are of record in the file of this patent:

UNITED STATES PATENTS

| Number | Name | Date |
| --- | --- | --- |
| 2,191,520 | Crawford et al. | Feb. 27, 1940 |
| 2,273,891 | Pollack et al. | Feb. 24, 1942 |